US00RE44348E

(19) United States
(12) Reissued Patent
Montagnese et al.

(10) Patent Number: US RE44,348 E
(45) Date of Reissued Patent: Jul. 9, 2013

(54) DETAIL-IN-CONTEXT TERRAIN DISPLACEMENT ALGORITHM WITH OPTIMIZATIONS

(75) Inventors: Catherine Montagnese, Calgary (CA); Mark H. A. Tigges, North Vancouver (CA)

(73) Assignee: Noregin Assets N.V., L.L.C., Dover, DE (US)

(21) Appl. No.: 13/216,950

(22) Filed: Aug. 24, 2011
(Under 37 CFR 1.47)

Related U.S. Patent Documents

Reissue of:
(64) Patent No.: 7,580,036
Issued: Aug. 25, 2009
Appl. No.: 11/401,349
Filed: Apr. 11, 2006

U.S. Applications:
(60) Provisional application No. 60/670,646, filed on Apr. 13, 2005.

(51) Int. Cl.
*G06T 15/20* (2011.01)

(52) U.S. Cl.
USPC ..... 345/427; 345/419; 345/581

(58) Field of Classification Search
None
See application file for complete search history.

(56) References Cited

U.S. PATENT DOCUMENTS 3,201,546 A 8/1965 Richardson
4,581,647 A 4/1986 Vye
4,630,110 A 12/1986 Cotton et al.
4,688,181 A 8/1987 Cottrell et al.
4,790,028 A 12/1988 Ramage (Continued)

FOREIGN PATENT DOCUMENTS

CA 2350342 11/2002
CA 2386560 11/2003

(Continued)

OTHER PUBLICATIONS

"Non-Final Office Action", U.S. Appl. No. 11/410,024, (Mar. 11, 2009), 35 pages.

(Continued)

*Primary Examiner* — Said Broome
(74) *Attorney, Agent, or Firm* — McAndrews, Held & Malloy, Ltd.

(57) ABSTRACT

A method for generating a presentation of a region-of-interest in a terrain data representation for display on a display screen, comprising: translating each point of the representation within a lens bounds to a rotated plane being normal to a vector defined by a position for the region-of-interest with respect to a base plane for the representation and an apex above the base plane, the lens bounds defining a shoulder region at least partially surrounding a focal bounds defining a focal region in which the position is located, each point having a respective height above the base plane; displacing each translated point from the rotated plane by a function of the respective height and a magnification for the focal region, the magnification varying across the shoulder region in accordance with a drop-off function; rotating each displaced point toward a viewpoint for the region-of-interest to maintain visibility of each displaced point and each point of the data representation beyond the lens bounds when viewed from the viewpoint; and, adjusting each rotated point corresponding to the shoulder region to provide a smooth transition to the data representation beyond the lens bounds.

47 Claims, 13 Drawing Sheets

U.S. PATENT DOCUMENTS

| | | | | |
|---|---|---|---|---|
| 4,800,379 | A | | 1/1989 | Yeomans |
| 4,885,702 | A | | 12/1989 | Ohba |
| 4,888,713 | A | | 12/1989 | Falk |
| 4,985,849 | A | | 1/1991 | Hideaki |
| 4,992,866 | A | | 2/1991 | Morgan |
| 5,048,077 | A | | 9/1991 | Wells et al. |
| 5,175,808 | A | | 12/1992 | Sayre |
| 5,185,599 | A | | 2/1993 | Dormink et al. |
| 5,185,667 | A | | 2/1993 | Zimmermann |
| 5,200,818 | A | | 4/1993 | Neta et al. |
| 5,206,721 | A | | 4/1993 | Ashida et al. |
| 5,227,771 | A | | 7/1993 | Kerr et al. |
| 5,250,934 | A | | 10/1993 | Denber et al. |
| 5,258,837 | A | | 11/1993 | Gormley |
| 5,321,807 | A | | 6/1994 | Mumford |
| 5,329,310 | A | | 7/1994 | Liljegren et al. |
| 5,341,466 | A | | 8/1994 | Perlin et al. |
| 5,416,900 | A | | 5/1995 | Blanchard et al. |
| 5,432,895 | A | | 7/1995 | Myers |
| 5,451,998 | A | | 9/1995 | Hamrick |
| 5,459,488 | A | | 10/1995 | Geiser |
| 5,473,740 | A | | 12/1995 | Kasson |
| 5,521,634 | A | | 5/1996 | McGary |
| 5,523,783 | A | | 6/1996 | Cho |
| 5,528,289 | A | | 6/1996 | Cortjens et al. |
| 5,539,534 | A | | 7/1996 | Hino et al. |
| 5,581,670 | A | | 12/1996 | Bier et al. |
| 5,583,977 | A | | 12/1996 | Seidl |
| 5,588,098 | A | | 12/1996 | Chen et al. |
| 5,594,859 | A | | 1/1997 | Palmer et al. |
| 5,596,690 | A | | 1/1997 | Stone et al. |
| 5,598,297 | A | | 1/1997 | Yamanaka et al. |
| 5,610,653 | A | | 3/1997 | Abecassis |
| 5,613,032 | A | | 3/1997 | Cruz et al. |
| 5,638,523 | A | | 6/1997 | Mullet et al. |
| 5,644,758 | A | | 7/1997 | Patrick |
| 5,651,107 | A | | 7/1997 | Frank et al. |
| 5,652,851 | A | | 7/1997 | Stone et al. |
| 5,657,246 | A | | 8/1997 | Hogan et al. |
| 5,670,984 | A | | 9/1997 | Robertson et al. |
| 5,680,524 | A | | 10/1997 | Maples et al. |
| 5,682,489 | A | | 10/1997 | Harrow et al. |
| 5,689,287 | A | * | 11/1997 | Mackinlay et al. ..... 345/427 |
| 5,689,628 | A | | 11/1997 | Robertson |
| 5,721,853 | A | | 2/1998 | Smith |
| 5,729,673 | A | | 3/1998 | Cooper et al. |
| 5,731,805 | A | | 3/1998 | Tognazzini et al. |
| 5,742,272 | A | | 4/1998 | Kitamura et al. |
| 5,745,166 | A | | 4/1998 | Rhodes et al. |
| 5,751,289 | A | | 5/1998 | Myers |
| 5,754,348 | A | | 5/1998 | Soohoo |
| 5,764,139 | A | | 6/1998 | Nojima et al. |
| 5,786,814 | A | | 7/1998 | Moran et al. |
| 5,798,752 | A | | 8/1998 | Buxton et al. |
| 5,808,670 | A | | 9/1998 | Oyashiki et al. |
| 5,812,111 | A | | 9/1998 | Fuji et al. |
| 5,818,455 | A | | 10/1998 | Stone et al. |
| 5,848,231 | A | | 12/1998 | Teitelbaum et al. |
| 5,852,440 | A | | 12/1998 | Grossman et al. |
| 5,872,922 | A | | 2/1999 | Hogan et al. |
| 5,909,219 | A | | 6/1999 | Dye |
| 5,923,364 | A | | 7/1999 | Rhodes et al. |
| 5,926,209 | A | | 7/1999 | Glatt |
| 5,949,430 | A | * | 9/1999 | Robertson et al. ..... 345/619 |
| 5,950,216 | A | | 9/1999 | Amro et al. |
| 5,969,706 | A | | 10/1999 | Tanimoto et al. |
| 5,973,694 | A | | 10/1999 | Steele et al. |
| 5,991,877 | A | | 11/1999 | Luckenbaugh |
| 5,999,879 | A | | 12/1999 | Yano |
| 6,005,611 | A | | 12/1999 | Gullichsen et al. |
| 6,037,939 | A | | 3/2000 | Kashiwagi et al. |
| 6,052,110 | A | | 4/2000 | Sciammarella et al. |
| 6,057,844 | A | | 5/2000 | Strauss |
| 6,064,401 | A | | 5/2000 | Holzman et al. |
| 6,067,372 | A | | 5/2000 | Gur et al. |
| 6,073,036 | A | | 6/2000 | Heikkinen et al. |
| 6,075,531 | A | | 6/2000 | DeStefano |
| 6,081,277 | A | | 6/2000 | Kojima |
| 6,084,598 | A | | 7/2000 | Chekerylla |
| 6,091,771 | A | | 7/2000 | Seeley et al. |
| 6,108,005 | A | | 8/2000 | Starks et al. |
| 6,128,024 | A | | 10/2000 | Carver |
| 6,133,914 | A | | 10/2000 | Rogers et al. |
| 6,154,840 | A | | 11/2000 | Pebly et al. |
| 6,160,553 | A | | 12/2000 | Robertson et al. |
| 6,184,859 | B1 | | 2/2001 | Kojima |
| 6,198,484 | B1 | | 3/2001 | Kameyama |
| 6,201,546 | B1 | | 3/2001 | Bodor et al. |
| 6,201,548 | B1 | | 3/2001 | Cariffe et al. |
| 6,204,845 | B1 | | 3/2001 | Bates et al. |
| 6,204,850 | B1 | | 3/2001 | Green |
| 6,215,491 | B1 | | 4/2001 | Gould |
| 6,219,052 | B1 | | 4/2001 | Gould |
| 6,241,609 | B1 | | 6/2001 | Rutgers |
| 6,246,411 | B1 | | 6/2001 | Strauss |
| 6,249,281 | B1 | | 6/2001 | Chen et al. |
| 6,256,043 | B1 | | 7/2001 | Aho et al. |
| 6,256,115 | B1 | | 7/2001 | Adler et al. |
| 6,256,737 | B1 | | 7/2001 | Bianco et al. |
| 6,266,082 | B1 | | 7/2001 | Yonezawa et al. |
| 6,271,854 | B1 | | 8/2001 | Light |
| 6,278,443 | B1 | | 8/2001 | Amro et al. |
| 6,278,450 | B1 | | 8/2001 | Arcuri et al. |
| 6,288,702 | B1 | | 9/2001 | Tachibana et al. |
| 6,304,271 | B1 | | 10/2001 | Nehme |
| 6,307,612 | B1 | | 10/2001 | Smith et al. |
| 6,320,599 | B1 | | 11/2001 | Sciammarella et al. |
| 6,337,709 | B1 | | 1/2002 | Yamaashi et al. |
| 6,346,938 | B1 | | 2/2002 | Chan et al. |
| 6,346,962 | B1 | | 2/2002 | Goodridge |
| 6,359,615 | B1 | | 3/2002 | Singh |
| 6,381,583 | B1 | | 4/2002 | Kenney |
| 6,384,849 | B1 | | 5/2002 | Morcos et al. |
| 6,396,648 | B1 | | 5/2002 | Yamamoto et al. |
| 6,396,962 | B1 | | 5/2002 | Haffey et al. |
| 6,400,848 | B1 | | 6/2002 | Gallagher |
| 6,407,747 | B1 | | 6/2002 | Chui et al. |
| 6,411,274 | B2 | | 6/2002 | Watanabe et al. |
| 6,416,186 | B1 | | 7/2002 | Nakamura |
| 6,417,867 | B1 | | 7/2002 | Hallberg |
| 6,438,576 | B1 | | 8/2002 | Huang et al. |
| 6,487,497 | B2 | | 11/2002 | Khavakh et al. |
| 6,491,585 | B1 | | 12/2002 | Miyamoto et al. |
| 6,504,535 | B1 | | 1/2003 | Edmark |
| 6,515,678 | B1 | | 2/2003 | Boger |
| 6,522,341 | B1 | | 2/2003 | Nagata |
| 6,542,191 | B1 | | 4/2003 | Yonezawa |
| 6,552,737 | B1 | | 4/2003 | Tanaka et al. |
| 6,559,813 | B1 | | 5/2003 | DeLuca et al. |
| 6,577,311 | B1 | | 6/2003 | Crosby et al. |
| 6,577,319 | B1 | | 6/2003 | Kashiwagi et al. |
| 6,584,237 | B1 | | 6/2003 | Abe |
| 6,590,568 | B1 | | 7/2003 | Astala et al. |
| 6,590,583 | B2 | | 7/2003 | Soohoo |
| 6,608,631 | B1 | | 8/2003 | Milliron |
| 6,612,930 | B2 | | 9/2003 | Kawagoe et al. |
| 6,631,205 | B1 | | 10/2003 | Melen et al. |
| 6,633,305 | B1 | | 10/2003 | Sarfeld |
| 6,690,387 | B2 | | 2/2004 | Zimmerman et al. |
| 6,720,971 | B1 | | 4/2004 | Yamamoto et al. |
| 6,727,910 | B2 | | 4/2004 | Tigges |
| 6,731,315 | B1 | | 5/2004 | Ma et al. |
| 6,744,430 | B1 | | 6/2004 | Shimizu |
| 6,747,610 | B1 | | 6/2004 | Taima et al. |
| 6,747,611 | B1 | | 6/2004 | Budd et al. |
| 6,760,020 | B1 | | 7/2004 | Uchiyama et al. |
| 6,768,497 | B2 | | 7/2004 | Baar et al. |
| 6,798,412 | B2 | | 9/2004 | Cowperthwaite |
| 6,833,843 | B2 | | 12/2004 | Mojaver et al. |
| 6,842,175 | B1 | | 1/2005 | Schmalstieg et al. |
| 6,882,755 | B2 | | 4/2005 | Silverstein et al. |
| 6,906,643 | B2 | | 6/2005 | Samadani et al. |
| 6,911,975 | B2 | | 6/2005 | Iizuka et al. |
| 6,919,921 | B1 | | 7/2005 | Morota et al. |
| 6,924,822 | B2 | | 8/2005 | Card et al. |
| 6,938,218 | B1 | | 8/2005 | Rosen |
| 6,956,590 | B1 | | 10/2005 | Barton et al. |

| | | | | |
|---|---|---|---|---|
| 6,961,071 | B2 | 11/2005 | Montagnese et al. | |
| 6,975,335 | B2 | 12/2005 | Watanabe | |
| 6,985,865 | B1 | 1/2006 | Packingham et al. | |
| 7,038,680 | B2 | 5/2006 | Pitkow | |
| 7,071,971 | B2 | 7/2006 | Elberbaum | |
| 7,084,886 | B2 | 8/2006 | Jetha et al. | |
| 7,088,364 | B2 | 8/2006 | Lantin | |
| 7,106,349 | B2 | 9/2006 | Baar et al. | |
| 7,133,054 | B2 | 11/2006 | Aguera Arcas | |
| 7,134,092 | B2 | 11/2006 | Fung et al. | |
| 7,158,878 | B2 | 1/2007 | Rasmussen | |
| 7,173,633 | B2 | 2/2007 | Tigges | |
| 7,173,636 | B2 | 2/2007 | Montagnese | |
| 7,197,719 | B2 | 3/2007 | Doyle et al. | |
| 7,213,214 | B2 | 5/2007 | Baar et al | |
| 7,233,942 | B2 | 6/2007 | Nye | |
| 7,246,109 | B1 | 7/2007 | Ramaswamy | |
| 7,256,801 | B2 | 8/2007 | Baar et al. | |
| 7,274,381 | B2 | 9/2007 | Mojaver et al. | |
| 7,275,219 | B2 | 9/2007 | Shoemaker | |
| 7,280,105 | B2 | 10/2007 | Cowperthwaite | |
| 7,283,141 | B2 | 10/2007 | Baar et al. | |
| 7,310,619 | B2 | 12/2007 | Baar et al. | |
| 7,312,806 | B2 | 12/2007 | Tigges | |
| 7,321,824 | B1 | 1/2008 | Nesbitt | |
| 7,411,610 | B2 | 8/2008 | Doyle | |
| 7,472,354 | B2 | 12/2008 | Jetha et al. | |
| 7,486,302 | B2 | 2/2009 | Shoemaker | |
| 7,489,321 | B2 | 2/2009 | Jetha et al. | |
| 7,495,678 | B2 | 2/2009 | Doyle et al. | |
| 2001/0040585 | A1 | 11/2001 | Hartford et al. | |
| 2001/0040636 | A1 | 11/2001 | Kato et al. | |
| 2001/0048447 | A1 | 12/2001 | Jogo | |
| 2001/0055030 | A1 | 12/2001 | Han | |
| 2002/0033837 | A1 | 3/2002 | Munro | |
| 2002/0038257 | A1 | 3/2002 | Joseph et al. | |
| 2002/0044154 | A1 | 4/2002 | Baar et al. | |
| 2002/0062245 | A1 | 5/2002 | Niu et al. | |
| 2002/0075280 | A1 | 6/2002 | Tigges | |
| 2002/0087894 | A1 | 7/2002 | Foley et al. | |
| 2002/0089520 | A1* | 7/2002 | Baar et al. | 345/645 |
| 2002/0093567 | A1 | 7/2002 | Cromer et al. | |
| 2002/0101396 | A1 | 8/2002 | Huston et al. | |
| 2002/0122038 | A1 | 9/2002 | Cowperthwaite | |
| 2002/0135601 | A1 | 9/2002 | Watanabe et al. | |
| 2002/0143826 | A1 | 10/2002 | Day et al. | |
| 2002/0171644 | A1 | 11/2002 | Reshetov et al. | |
| 2002/0180801 | A1 | 12/2002 | Doyle et al. | |
| 2003/0006995 | A1 | 1/2003 | Smith et al. | |
| 2003/0007006 | A1 | 1/2003 | Baar et al. | |
| 2003/0048447 | A1 | 3/2003 | Harju et al. | |
| 2003/0052896 | A1 | 3/2003 | Higgins et al. | |
| 2003/0061211 | A1 | 3/2003 | Shultz et al. | |
| 2003/0100326 | A1 | 5/2003 | Grube et al. | |
| 2003/0105795 | A1 | 6/2003 | Anderson et al. | |
| 2003/0112503 | A1 | 6/2003 | Lantin | |
| 2003/0118223 | A1 | 6/2003 | Rahn et al. | |
| 2003/0137525 | A1 | 7/2003 | Smith | |
| 2003/0151625 | A1 | 8/2003 | Shoemaker et al. | |
| 2003/0151626 | A1* | 8/2003 | Komar et al. | 345/767 |
| 2003/0174146 | A1 | 9/2003 | Kenoyer | |
| 2003/0179198 | A1 | 9/2003 | Uchiyama | |
| 2003/0179219 | A1 | 9/2003 | Nakano et al. | |
| 2003/0179237 | A1 | 9/2003 | Nelson et al. | |
| 2003/0196114 | A1 | 10/2003 | Brew et al. | |
| 2003/0227556 | A1 | 12/2003 | Doyle | |
| 2003/0231177 | A1* | 12/2003 | Montagnese et al. | 345/419 |
| 2004/0026521 | A1 | 2/2004 | Colas et al. | |
| 2004/0056869 | A1 | 3/2004 | Jetha et al. | |
| 2004/0056898 | A1 | 3/2004 | Jetha et al. | |
| 2004/0111332 | A1 | 6/2004 | Baar et al. | |
| 2004/0125138 | A1 | 7/2004 | Jetha et al. | |
| 2004/0150664 | A1 | 8/2004 | Baudisch | |
| 2004/0217979 | A1 | 11/2004 | Baar et al. | |
| 2004/0240709 | A1 | 12/2004 | Shoemaker | |
| 2004/0257375 | A1 | 12/2004 | Cowperthwaite | |
| 2004/0257380 | A1 | 12/2004 | Herbert et al. | |
| 2005/0041046 | A1 | 2/2005 | Baar et al. | |
| 2005/0134610 | A1 | 6/2005 | Doyle et al. | |
| 2005/0278378 | A1 | 12/2005 | Frank | |
| 2005/0285861 | A1 | 12/2005 | Fraser | |
| 2006/0026521 | A1 | 2/2006 | Hotelling et al. | |
| 2006/0033762 | A1 | 2/2006 | Card et al. | |
| 2006/0036629 | A1 | 2/2006 | Gray | |
| 2006/0082901 | A1 | 4/2006 | Shoemaker | |
| 2006/0098028 | A1 | 5/2006 | Baar | |
| 2006/0139375 | A1 | 6/2006 | Rasmussen et al. | |
| 2006/0192780 | A1 | 8/2006 | Lantin | |
| 2006/0214951 | A1 | 9/2006 | Baar et al. | |
| 2007/0033543 | A1 | 2/2007 | Ngari et al. | |
| 2007/0064018 | A1 | 3/2007 | Shoemaker et al. | |
| 2007/0097109 | A1 | 5/2007 | Shoemaker et al. | |

FOREIGN PATENT DOCUMENTS

| | | |
|---|---|---|
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |

OTHER PUBLICATIONS

"Foreign Office Action", Application Ser. No. 2002-536993, (Mar. 11, 2009), 2 pages.

Schmalstieg, Dieter et al., "Using transparent props for interaction with the virtual table", Application Ser. No. 11/410,024, Proceedings of the 1999 symposium on Interactive 3D graphics, (Apr. 26, 1999), 8 pages.

"Non Final Office Action", U.S. Appl. No. 10/705,199, (May 12, 2009), 46 pages.

"Non Final Office Action", U.S. Appl. No. 11/541,778, (Jun. 19, 2009), 36 pages.

"Non Final Office Action", U.S. Appl. No. 11/935,222, (Feb. 20, 2009), 12 pages.

Ikedo, T. "A Realtime Video-Image Mapping User Polygon Rendering Techniques". IEEE Intl. conf on Ottawa, ONT, Canada Jun. 3-6, 1997, Los Alamitos, CA, USA; IEEE Comput. Soc, US, XP010239181, ISBN: 0-8186-7819-4 Sections 2, 4.4; Multimedia Computing and Systems '97 Proceedings, (Jun. 3, 1997), pp. 127-134.

Bouju, A. et al., "Client Server Architecture for Accessing Multimedia and Geographic Databases within Embedded Systems", Database and Expert Systems Applications, 1999 Proceedings Tenth International Workshop on Florence, Italy Sep. 1-3, 1999, Los Alamitos, CA, USA, IEEE Comput. Soc, US, XP010352370, ISBN:0-7895-0281-4, abstract, figure 2,(Sep. 1-3, 1999). pp. 750-764.

Robertson, G et al., "The Document Lens", UIST. Proceedings of the Annual ACM Symposium on User Interface Software and Technology, abstract figures 3, 4,(Nov. 3, 1993), pp. 101-108.

Dursteler, Juan C., "The digital magazine of InfoVis.net", Retrieved from: http://www.infovis.net/printMag.php?num=85&lang=2; (Apr. 22, 2002).

Kuederle, Oliver "Presentation of Image Sequences: A Detail-In-Context Approach", Thesis, Simon Fraser University; (Aug. 2000), pp. 1-3, 5-10, 29-31.

Microsoft Corp., "Microsoft Paint", Microsoft Corp.,(1981-1998), Paint 1-14.

"Electronic Magnifying Glasses", IBM Technical Disclosure Bulletin, IBM Corp., New York, US, vol. 37, No. 3; XP000441501, ISSN: 0018-8689 the whole document; (Mar. 1, 1994), pp. 353-354.

Keahey, T. A., "The Generalized Detail-In-Context Problem" Information Visualization 1998, Proceedings; IEEE Symposium On Research Triangle, CA, USA; Los Alamitos, CA, USA, IEEE Comput, Soc, US; XP010313304; ISBN: 0-8186-9093.(Oct. 19-20, 1998), pp. 44-51, 152.

Carpendale, M S T et al., "Extending distortion viewing from 2D to 3D", IEEE Computer Graphics and Applications, IEEE Inc. New York, US, vol. 17, No. 4. XP000927815 ISSN: 0272-1716. (Jul. 1997), pp. 42-51.

Viega, J et al., "3D magic lenses, Proceedings of the 9th annual ACM symposium on User interface software and technology"; Pub 1996 ACM Press New York, NY, USA, (1996), pp. 51-58.

Carpendale, M. Sheelagh T., et al., "3-Dimensional Pliable Surfaces: For the Effective Presentation of Visual Information", UIST '95, 8th Annual Symposium on User Interface Software and Technology, Proceedings of The ACM Symposium on User Interface Software and Technology, Pittsburgh, PA, ACM Symposium on User Interface Software and Technology, New York, Nov. 14, 1995 (1995-, (Nov. 14-17, 1995), pp. 217-226.
Tominski, Christian et al., "Fisheye Tree Views and Lenses for Graph Visualization", Jul. 2006, pp. 1-8.
Keahey T. A., "Getting Along: Composition of Visualization Paradigms", Visual Insights, Inc.; (2001).
Sakamoto, Chikara et al., "Design and Implementation of a Parallel Pthread Library (PPL) with Parallelism and Portability", Systems and Computers in Japan, New York, US, vol. 29, No. 2; XP000752780, ISSN:0882-1666 abstract,(Feb. 1, 1998), pp. 28-35.
Deng, K. et al., "Texture Mapping with a Jacobian-Based Spatially-Variant Filter", Proceedings 10th Pacific Conference on Computer Graphics and Applications, Beijing, China, 2002 Los Alamitos, CA, USA, IEEE Comput. Soc, USA, XP00224932, ISBN, 0-7695-1784-6 the whole document, (Oct. 9-11, 2002), pp. 460-461.
Welsh, Michelle "Futurewave Software", Business Wire; (Nov. 15, 1993).
Lamar, et al., "A Magnification Lens for Interactive Volume Visualization", ACM; pp. 1-10, Oct. 2001.
Fitzmaurice, G. et al., "Tracking Menus", UIST; (2003), pp, 71-79.
Stone, et al., "The movable filter as a user interface tool", Proceedings of CHI ACM; (1992), pp. 306-312.
Baudisch, P. et al., "Halo: a Technique For Visualizing Off-Screen Locations", CHI; (Apr. 5-10, 2003).
Baudisch, P. et al., "Drag-And-Pop: Techniques for Accessing Remote Screen Content on Touch-And-Pen-Operated Systems", Interact '03, (2003).
Carpendale, M. S. T. et al., "Making Distortions Comprehensible", Visual Languages, Proceedings, 1997 IEEE Symposium On Isle of Capri, Italy, Sep. 23-26, 1997, Los Alamitos, CA, USA, IEEE Comput. Soc., US, Sep. 23, 1997; XP010250566, ISBN: 0-8186-8144-6,(Sep. 23-26, 1997), pp. 36-45.
Ito, Minoru et al., "A Three-Level Checkerboard Pattern (TCP) Projection Method for Curved Surface Measurement", Pattern Recognition, Pergamon Press Inc., Elmsford, N.Y., US vol. 28, No. 1; XP004014030, ISSN 0031-3203,(1995), pp. 27-40.
Keahey, T A., et al., "Nonlinear Magnification Fields", Information Visualization, 1997, Proceedings, IEEE Symposium on Phoenix, AZ, USA, Los Alamitos, CA, USA, IEEE Comput. Soc., US; XP010257169; ISBN: 0-8186-8189-6,(Oct. 20-21, 1997), pp. 51-58 and 121.
Rauschenbach, U., "The Rectangular Fish Eye View as an Efficient Method for the Transmission and Display of Large Images", Image Processing, ICIP 99, Proceedings, 1999 International Conference On, Kobe, Japan, Oct. 24-28, 1999, Piscataway, NJ, USA, IEEE, US, XP010368852, ISBN 0-7803-5467-2 p. 115, left-hand column—p. 116, paragraph 3, p. 118, paragraph 7.1; (1999), pp. 115-119.
Boots, B. N., "Delauney Triangles: An Alternative Approach to Point Pattern Analysis" Proc. Assoc. Am. Geogr. 6, (1974), p. 26-29.
Carpendale et al., "Distortion Viewing Techniques for 3-Dimensional Data", Information Visualization '96, Proceedings IEEE Symposium on San Francisco, CA, USA, Los Alamitos, CA, USA, IEEE Comput. Soc, US Oct. 28, 1996; XP010201944; ISBN: 0-8186-7668-X,(Oct. 28-29, 1996), pp. 46-53, 119.
Leung, Y. K., et al., —A Review and Taxonomy of Distortion-Oriented Presentation Techniques, ACM Transactions on Computer-Human Interaction, 'Online! vol. 1, No. 2, XP002252314; Retrieved from the Internet: <URL:http://citeseernj.nec.com/ leung94review.html> ' retrieved on Aug. 21, 2003 the whole document, (Jun. 1994), pp. 126-160.
"Non Final Office Action", U.S. Appl. No. 10/358,394, (Mar. 13, 2009).
Sarkar, et al., "Stretching the Rubber Sheet: A Metaphor for Viewing Large Layouts on Small Screens", Proc. of the 6th annual ACM symp. on User interface software an technology, Atlanta, GA, (Dec. 1993), p. 81-91.
Carpendale, et al., "Graph Folding. Extending Detail and Context Viewing into a Tool for Subgraph Comparisons", In Proceedings of Graph Drawing 1995, Passau, Germany., (1995), pp. 127-139.
Carpendale, M.S.T. "A Framework for Elastic Presentation Space", http://pades.cpsc.ucaldary.ca/—sheelagh/personal/thesis/, (Nov. 19, 1999).
"Non Final Office Action", U.S. Appl. No. 11/542,120, (Jan. 22, 2009), 20 pages.
Cowperthwaite, David J., "Occlusion Resolution Operators for Three-Dimensional Detail-In-Context", Burnaby, British Columbia: Simon Fraser University, (2000).
Carpendale, M.S.T. "A Framework for Elastic Presentation Space", Thesis Simon Fraser University; XP001051168; cited in the application, Chapter 3-5, appendix A,B; (Mar. 1999), pp. 1-271.
Carpendale, M.S.T et al., "Exploring Distinct Aspects of the Distortion Viewing Paradigm", Technical Report TR 97-08; School of Computer Science, Simon Fraser University, Burnaby, British Columbia, Canada; (Sep. 1997).
Cowperthwaite, David J., et al., "Visual Access for 3D Data", in Proceedings of ACM CHI 96 Conference on Human Factors in Computer Systems, vol. 2 of Short Papers: Alternative Methods of Interaction; (1996),pp. 175-176.
Keahey, T. A., "Visualization of High-Dimensional Clusters Using NonLinear Magnification", Technical Report LA-UR-98-2776, Los Alamos National Laboratory, (1998).
Tigges, M. et al., "Generalized Distance Metrics For Implicit Surface Modeling", Proceedings of the Tenth Western Computer Graphics Symposium; (Mar. 1999).
Bossen, F. J., "Anisotropic Mesh Generation With Particles", Technical Report CMU-CS-96-134, CS Dept, Carnegie Mellon University; (May 1996).
Bossen, F. J., et al., "A Pliant Method for Anisotropic Mesh Generation", 5th Intl. Meshing Roundtable; (Oct. 1996), pp. 63-74.
Wilson, et al., "Direct Volume Rendering Via 3D Textures", Technical Report UCSC-CRL-94-19, University of California, Santa Cruz, Jack Baskin School of Engineering; (Jun. 1994).
Carpendale, M. S. T., Montagnese, C., A framework for unifying presentation space, Nov. 2001, ACM Press, Proceedings of the 14th annual ACM symposium on User interface software and technology, vol. 3, Issue 2, pp. 61-70.*
Carpendale, Marianne S.T., "A Framework for Elastic Presentation Space" (Burnaby, British Columbia: Simon Fraser University, 1999).
Robertson, et al., ""The Document Lens"", (1993),pp. 101-108.
"Presentation for CGDI Workshop", Retrieved from: http://www.geoconnections.org/developersCorner/devCorner$_{13}$ devNetwork/meetings/2002.05.30/IDELIX_CGDI_20020530_dist.pdf, (May 2002).
Carpendale, M.S.T. "A Framework for Elastic Presentation Space", *PhD thesis, Simon Fraser University;* (1999),pp. 69, 72, 78-83,98-100, 240 and 241.
Keahey, T. A., et al., ""Techniques For Non-Linear Magnification Transformations"", *Information Visualization '96, Proceedings IEEE Symposium on,* San Francisco, CA, Los Alamitos, CA, USA, *IEEE Comput. Soc,* US: XP010201943; ISBN: 0-8186-7668-X the whole document,(Oct. 28, 1996),pp. 38-45.
Keahey, T. A., "Nonlinear Magnification", (Indiana University Computer Science), (1997).
Watt, et al., "Advanced Animation and Rendering Techniques", (*Addison-Wesley Publishing*), (1992),p. 106-108.

* cited by examiner

600

700

900

1100

1200

DETAIL-IN-CONTEXT TERRAIN DISPLACEMENT ALGORITHM WITH OPTIMIZATIONS

Matter enclosed in heavy brackets [ ] appears in the original patent but forms no part of this reissue specification; matter printed in italics indicates the additions made by reissue.

This application claims priority from U.S. Provisional Patent Application No. 60/670,646, filed Apr. 13, 2005, and incorporated herein by reference.

FIELD OF THE INVENTION

The invention relates to the field of computer graphics processing, and more specifically, to a method and system for generating detail-in-context lens presentations for terrain or elevation data.

BACKGROUND OF THE INVENTION

Display screens are the primary visual display interface for computers. One problem with display screens is that they are limited in size, thus presenting a challenge to user interface design, particularly when large amounts of visual information are to be displayed. This problem is often referred to as the "screen real estate problem". Known tools for addressing this problem include panning and zooming. While these tools are suitable for a large number of display applications, they become less effective when sections of the visual information are spatially related, for example in layered maps and three-dimensional representations. In this type of visual information display, panning and zooming are not as effective as much of the context of the visual information may be hidden in the panned or zoomed display.

A more recent solution to the screen real estate problem involves the application of "detail-in-context" presentation techniques. Detail-in-context is the magnification of a particular region-of-interest (the "focal region" or "detail") in a presentation while preserving visibility of the surrounding information (the "context"). This technique has applicability to the display of large surface area media (e.g., digital maps) on display screens of variable size including those of graphics workstations, laptop computers, personal digital assistants ("PDAs"), and cellular telephones.

In general, a detail-in-context presentation may be considered as a distorted view (or distortion) of a region-of-interest in an original image or representation where the distortion is the result of the application of a "lens" like distortion function to the original image. The lens distortion is typically characterized by magnification of a region-of-interest (the "focal region") in an image where detail is desired in combination with compression of a region of the remaining information surrounding the region-of-interest (the "shoulder region"). The area of the image affected by the lens includes the focal region and the shoulder region. These regions define the perimeter of the lens. The shoulder region and the area surrounding the lens provide "context" for the "detail" in the focal region of the lens. The resulting detail-in-context presentation resembles the application of a lens to the image. A detailed review of various detail-in-context presentation techniques such as "Elastic Presentation Space" ("EPS") may be found in a publication by Marianne S. T. Carpendale, entitled "A Framework for Elastic Presentation Space" (Carpendale, Marianne S. T., A Framework for Elastic Presentation Space (Burnaby, British Columbia: Simon Fraser University, 1999)), which is incorporated herein by reference.

Note that in the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed on a display screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

One shortcoming of existing detail-in-context presentation methods is their inability to effectively distort terrain or other elevation data including digital elevations model ("DEM") data. In general, a DEM is a representation of cartographic information in a raster, vector, or other data format. Typically, a DEM consists of a sampled array of elevations for a number of ground positions at regularly spaced intervals. The intervals may be, for example, 7.5-minute, 15-minute, 2-arc-second (also known as 30-minute), and 1-degree units. The 7.5- and 15-minute DEMs may be categorized as large-scale, 2-arc-second DEMs may be categorized as intermediate-scale, and 1-degree DEMs may be categorized as small-scale. Often, for example, the distortion of DEM data using existing detail-in-context methods will result in a detail-in-context presentation in which the viewer appears to be "underneath" the data.

A need therefore exists for an effective method and system for generating detail-in-context presentations for elevation or terrain data. Accordingly, a solution that addresses, at least in part, the above and other shortcomings is desired.

SUMMARY OF THE INVENTION

According to one aspect of the invention, there is provided a method for generating a presentation of a region-of-interest in a terrain data representation for display on a display screen, comprising: translating each point of the representation within a lens bounds to a rotated plane being normal to a vector defined by a position for the region-of-interest with respect to a base plane for the representation and an apex above the base plane, the lens bounds defining a shoulder region at least partially surrounding a focal bounds defining a focal region in which the position is located, each point having a respective height above the base plane; displacing each translated point from the rotated plane by a function of the respective height and a magnification for the focal region, the magnification varying across the shoulder region in accordance with a drop-off function; rotating each displaced point toward a viewpoint for the region-of-interest to maintain visibility of each displaced point and each point of the data representation beyond the lens bounds when viewed from the viewpoint; and, adjusting each rotated point corresponding to the shoulder region to provide a smooth transition to the data representation beyond the lens bounds.

The method may further include projecting each adjusted point within the shoulder region, each rotated point within the focal region, and each point of the representation beyond the lens bounds onto a plane in a direction aligned with the viewpoint to produce the presentation. The method may further include displaying the presentation on the display screen. The step of translating each point may further include determining a maximum translation for a point on the lens bounds and determining a translation for each point within the lens bounds by scaling the maximum translation in accordance with a distance of each point from the lens bounds. The function may be a product of the magnification and a difference between a magnitude of a vector defined by an origin of the representation with respect to the base plane and the viewpoint and the respective height. The step of rotating each displaced point may further include determining an axis of rotation for the rotating from a cross product of a vector defined by an origin of the representation with respect to the base plane and the viewpoint and a vector defined by the origin and the apex. The step of adjusting each rotated point corresponding to the shoulder region may further include adding to each rotated point a weighted average of first and second difference vectors scaled by the drop-off function, the first and second difference vectors corresponding to a difference between first and seconds points on the lens bound and corresponding first and second displaced points, respectively, the first and second points being on a line drawn through the rotated point. The method may further include approximating the representation with a mesh. And, the method may further include approximating the respective height using height information from surrounding points.

In accordance with further aspects of the present invention there are provided apparatus such as a data processing system, a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and methods have not been described or shown in detail in order not to obscure the invention. The term "data processing system" is used herein to refer to any machine for processing data, including the computer systems and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

As mentioned above, a detail-in-context presentation may be considered as a distorted view (or distortion) of a portion of the original representation or image where the distortion is the result of the application of a "lens" like distortion function to the original representation. In general, detail-in-context data presentations are characterized by magnification of areas of an image where detail is desired, in combination with compression of a restricted range of areas of the remaining information, the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

Figure 1:
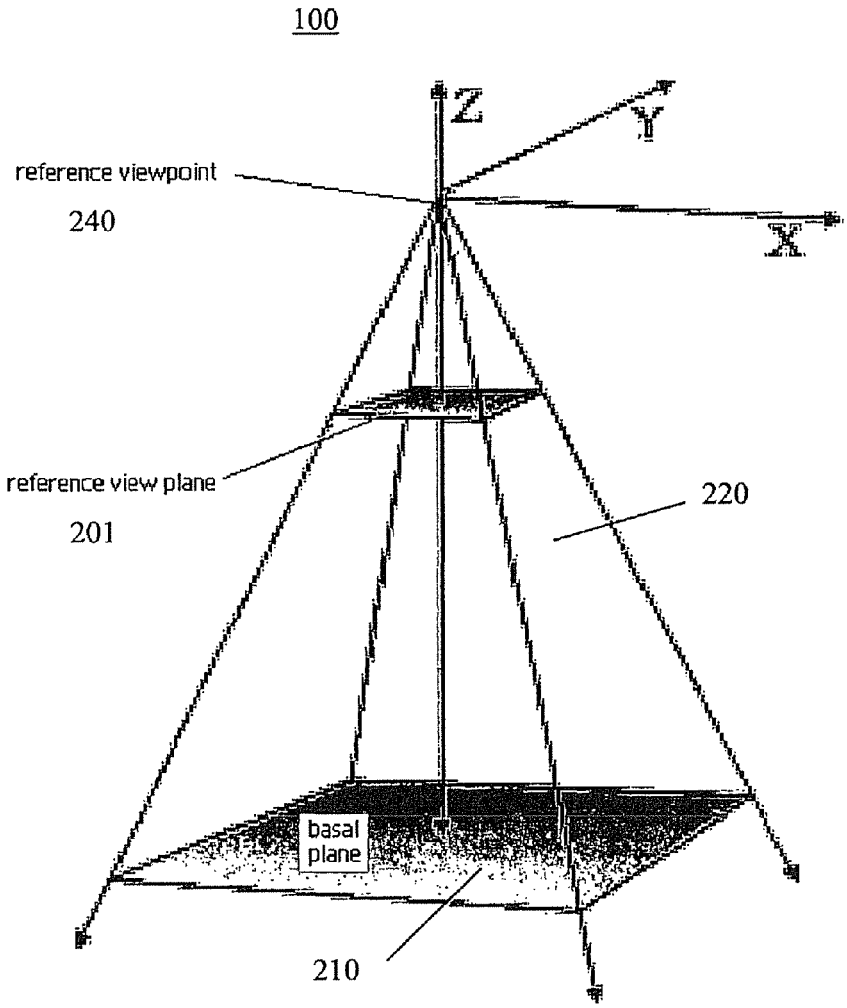
FIG. 1 is a graphical representation illustrating the geometry for constructing a three-dimensional perspective viewing frustum, relative to an x, y, z coordinate system, in accordance with elastic presentation space graphics technology and an embodiment of the invention.

FIG. 1 is a graphical representation illustrating the geometry 100 for constructing a three-dimensional ("3D") perspective viewing frustum 220, relative to an x, y, z coordinate system, in accordance with elastic presentation space (EPS) graphics technology and an embodiment of the invention. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape containing the frustum 220. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
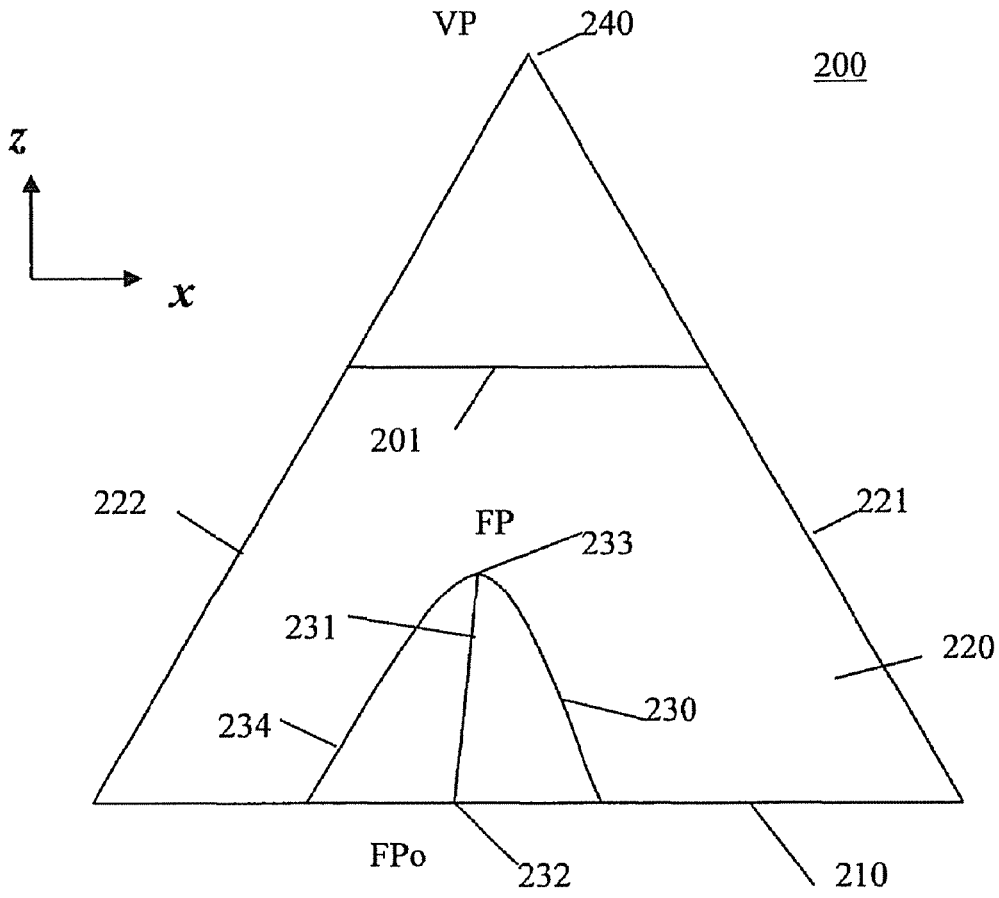
FIG. 2 is a graphical representation illustrating the geometry of a presentation in accordance with elastic presentation space graphics technology and an embodiment of the invention.

FIG. 2 is a graphical representation illustrating the geometry 200 of a presentation in accordance with EPS graphics technology and an embodiment of the invention. EPS graphics technology employs viewer-aligned perspective projections to produce detail-in-context presentations in a reference view plane 201 which may be viewed on a display. Undistorted 2D data points are located in a base plane 210 of a 3D perspective viewing volume or frustum 220 which is defined by extreme rays 221 and 222 and the base plane 210. The VP 240 is generally located above the centre point of the base plane 210 and reference view plane ("RVP") 201. Points in the base plane 210 are displaced upward onto a distorted surface or "lens" 230 which is defined by a general 3D distortion function (i.e., a detail-in-context distortion basis function). The direction of the viewer-aligned perspective projection corresponding to the distorted surface or lens 230 is indicated by the line FPo-FP 231 drawn from a point FPo 232 in the base plane 210 through the point FP 233 which corresponds to the focal point, focus, or focal region 233 of the distorted surface or lens 230. Typically, the perspective projection has a uniform direction 231 that is viewer-aligned (i.e., the points FPo 232, FP 233, and VP 240 are collinear).

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e., the context) 234, the end result typically giving the appearance of a lens 230 having been applied to the display surface. The areas of the lens 230 where compression occurs may be referred to as the "shoulder" or shoulder region 234 of the lens 230. The area of the representation transformed by the lens may be referred to as the "lensed area". The lensed area thus includes the focal region 233 and the shoulder region 234. To reiterate, the source image or representation to be viewed is located in the base plane 210. Magnification 233 and compression 234 are achieved through elevating elements of the source image relative to the base plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 210, 234 the local region of interest 233.

For example, and referring to FIGS. 1 and 2, in two dimensions, EPS can be implemented through the projection of an image onto a reference plane 201 in the following manner. The source image or representation is located on a base plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function (i.e., the shoulder function or drop-off function) describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the base plane 210 are described as lenses, lens types, or lens functions. Lens functions that describe basic lens types with point and circular focal regions, as well as certain more complex lenses and advanced capabilities such as folding, have previously been described by Carpendale.

Figure 3:
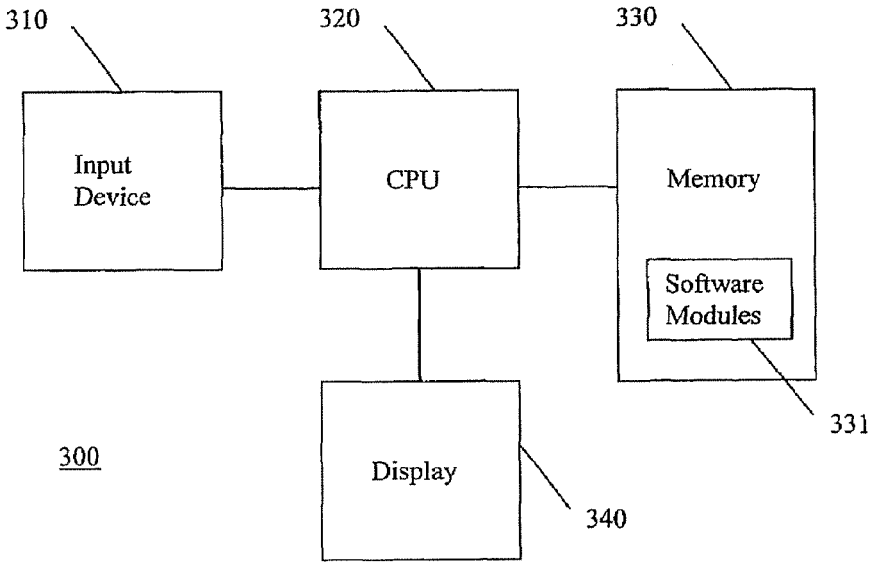
FIG. 3 is a block diagram illustrating a data processing system adapted for implementing an embodiment of the invention.

FIG. 3 is a block diagram of a data processing system 300 adapted to implement an embodiment of the invention. The data processing system 300 is suitable for implementing EPS technology and for generating detail-in-context presentations of elevation data representations. The data processing system 300 includes an input device 310, a central processing unit ("CPU") 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware or software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable, signal or signal-bearing medium that is uploaded to a network by a vendor or supplier of the programmed instructions, and this signal or signal-bearing medium may be downloaded through an interface to the data processing system 300 from the network by end users or potential buyers.

As mentioned, detail-in-context presentations of data using techniques such as pliable surfaces, as described by Carpendale, are useful in presenting large amounts of information on display surfaces of variable size. Detail-in-context views allow magnification of a particular region-of-interest (the "focal region") 233 in a data presentation while preserving visibility of the surrounding information 210.

Figure 11:
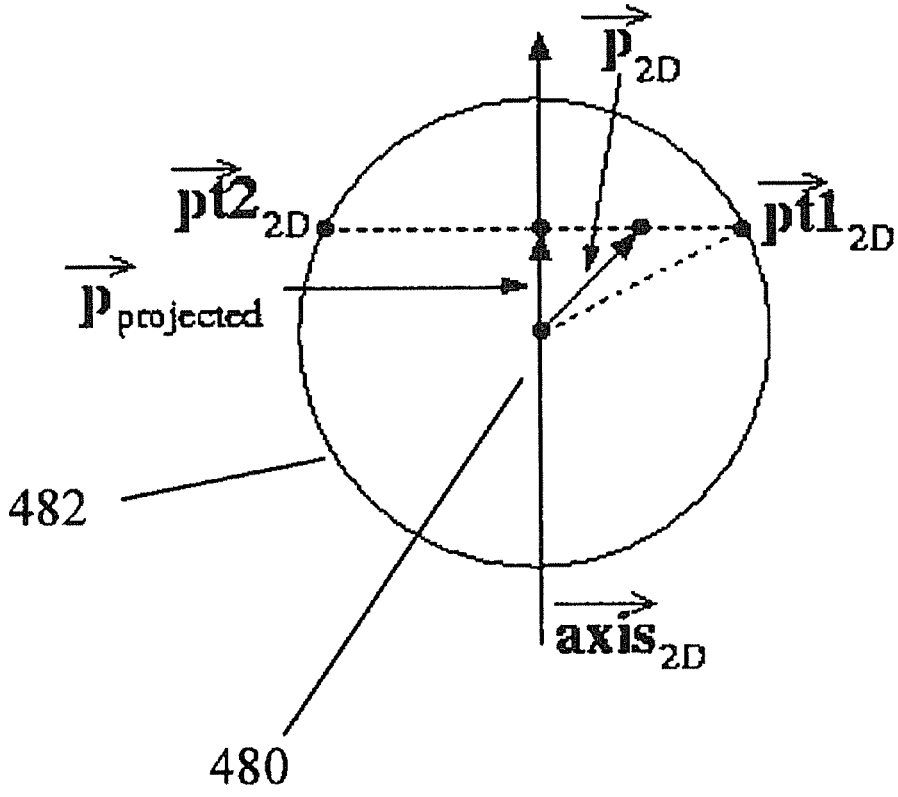
FIG. 11 is a graphical representation illustrating the geometry of the projection of the two dimensional version of a point onto the axis of rotation and the resulting edge points in accordance with an embodiment of the invention.
Figure 12:
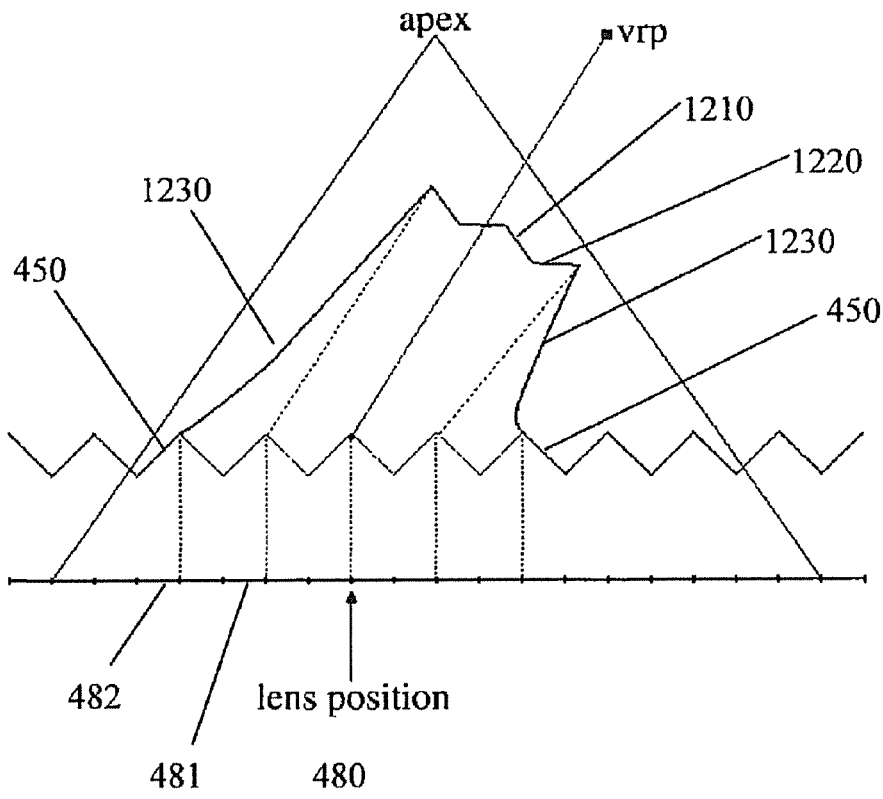
FIG. 12 is a graphical representation illustrating the geometry of the final lens resulting from the displacement of terrain data that fell within the lens bounds in accordance with an embodiment of the invention; and, FIG. 13 is a flow chart illustrating operations of modules within the memory of a data processing system for generating a presentation of a region-of-interest in a terrain data representation for display on a display screen, in accordance with an embodiment of the application.

Now, referring to FIG. 12, the present invention provides a method for viewing a region-of-interest (e.g., at 480) within terrain data 450 using a detail-in-context lens 1210. A terrain dataset 450 is assumed to consist of a set of (x, y, z) coordinates, where the (x, y) coordinates denote a position on the earth, and the z coordinate specifies the elevation of the earth at the (x, y) position. The detail-in-context lens 1210 is assumed to have a circular focal region 1220 (although it may have any other shape) and a shoulder region 1230 defined by a finite drop-off function or shoulder function. The method of the present invention allows a user to apply a detail-in-context terrain lens 1210 to a terrain dataset 450, and view the terrain data from any point above the terrain surface. As the viewpoint vrp moves, the terrain lens 1210 is altered such that the terrain data that is in the focal region 1220 of the lens 1210 is always in view. The method of the present invention includes the steps described below which refer to FIGS. 4-12.

Figure 4:
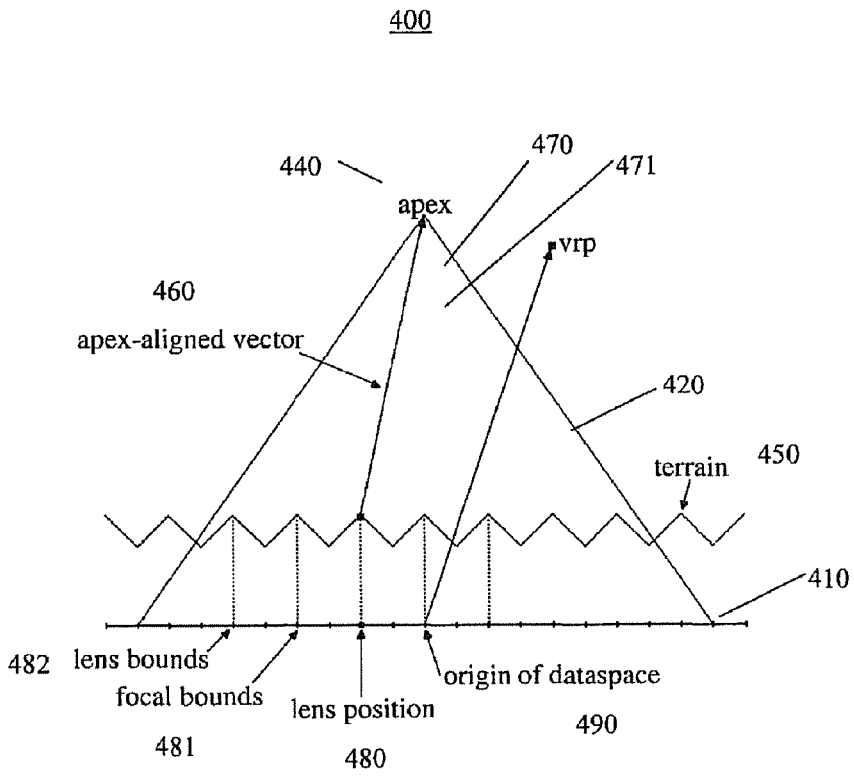
FIG. 4 is a graphical representation illustrating the geometry of a terrain dataspace and an apex-aligned vector in accordance with an embodiment of the invention.

FIG. 4 is a graphical representation illustrating the geometry 400 of a terrain dataspace 470 and an apex-aligned vector 460 in accordance with an embodiment of the invention. FIG. 4 shows the definition of the terrain dataspace 470 and the apex-aligned vector 460.

Step 1: Define the terrain dataspace 470 in which the terrain dataset 450 is viewed. The terrain dataspace 470 consists of a perspective viewing volume 471 that is defined by an apex (or camera position) 440 and a viewing frustum 420. The terrain dataset 450 is defined with respect to the z=0 base plane 410 (i.e., the x, y plane). A user can view the terrain dataset 450 from any point above the terrain surface 410 . The viewpoint is referred to as the view reference point vrp in FIG. 4.

Step 2: Calculate the apex-aligned vector 460. The apex-aligned vector 460 is a vector from the three-dimensional lens position 480 to the apex 440 of the viewing frustum 420. The x, y coordinates of the three-dimensional lens position 480 are defined by the user in the z=0 plane. The z coordinate of the lens position 480 is found by approximation using the surrounding terrain dataset 450 elevation values. The method of approximation is described in more detail in the optimizations section below. Mathematically, the apex-aligned vector is defined as a=apex−lenspos, where apex is the apex 440 of the viewing frustum 420 and lenspos is the three-dimensional lens position 480. FIG. 4 illustrates the definition of the apex-aligned vector 460.

Figure 5:
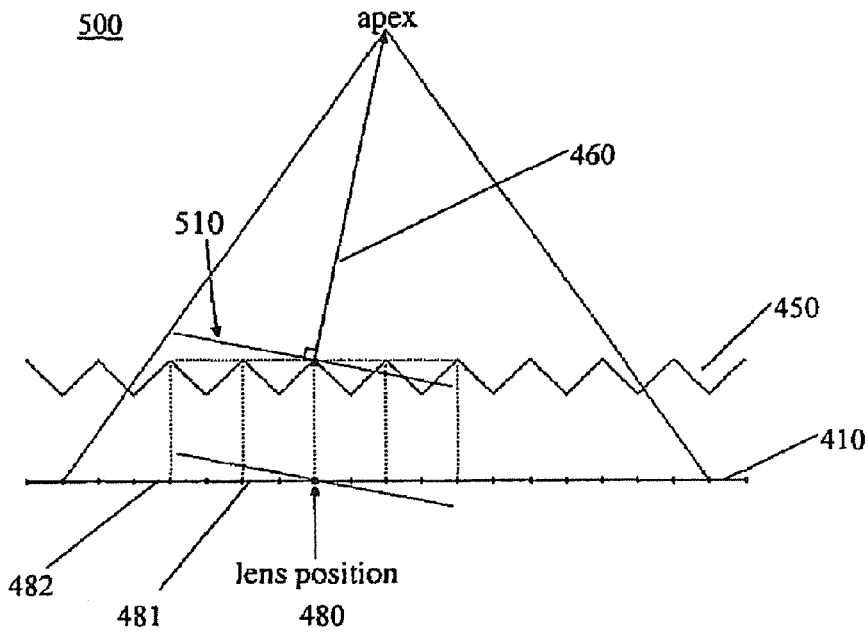
FIG. 5 is a graphical representation illustrating the geometry of a portion of the base plane in which the terrain dataset is defined and which is rotated such that it remains perpendicular to the apex-aligned vector in accordance with an embodiment of the invention.

FIG. 5 is a graphical representation illustrating the geometry 500 of a portion 510 of the base plane 410 in which the terrain dataset 450 is defined and which is rotated such that it remains perpendicular to the apex-aligned vector 460 in accordance with an embodiment of the invention.

Step 3: Rotate each point of the dataset 450 that falls within the lens bounds 482 such that a corresponding portion 510 of the base plane 410 in which the terrain dataset 450 is defined remains perpendicular to the apex-aligned vector 460. As stated above, the terrain dataset 450 is defined with respect to the z=0 plane. As the lens position 480 is moved, the apex-aligned vector 460 will no longer be perpendicular to the z=0 plane (see FIG. 5). In order to maintain the spatial relationship of the points that fall within the lens bounds 482 during the detail-in-context displacement, the portion 510 of the base plane 410 in which the terrain dataset 450 is defined is rotated such that it remains perpendicular to the apex-aligned vector 460.

Each point of the dataset 450 within the lens bounds 482 is rotated by an appropriate amount such that each point maintains its perpendicular spatial relationship with respect to the apex-aligned vector 460. Since the displacement algorithm utilizes a perspective viewing volume 471, and the terrain dataset 450 is assumed to be viewed through the perspective viewing volume 471, the rotation of each point is specified as a translation instead of using a rotation matrix. This is due to the fact that, when viewed through a perspective viewing volume 471, objects do not visually maintain their shapes as they are rotated about arbitrary axes. For example, a circle that is defined in the z=0 plane within a viewing frustum that has an apex defined along the positive z axis will visually become an oval when rotated about the x or y axes. In order to maintain the visual shape of the lens and focal region, each point within the lens bounds 482 is translated an appropriate distance along the apex-aligned vector 460. This ensures that the bounds 482 of the lens remain visually constant as the lens is moved around the dataspace 470. The calculations for determining the amount of translation for each point that falls within the lens bounds 482 are described in the following.

Figure 6:
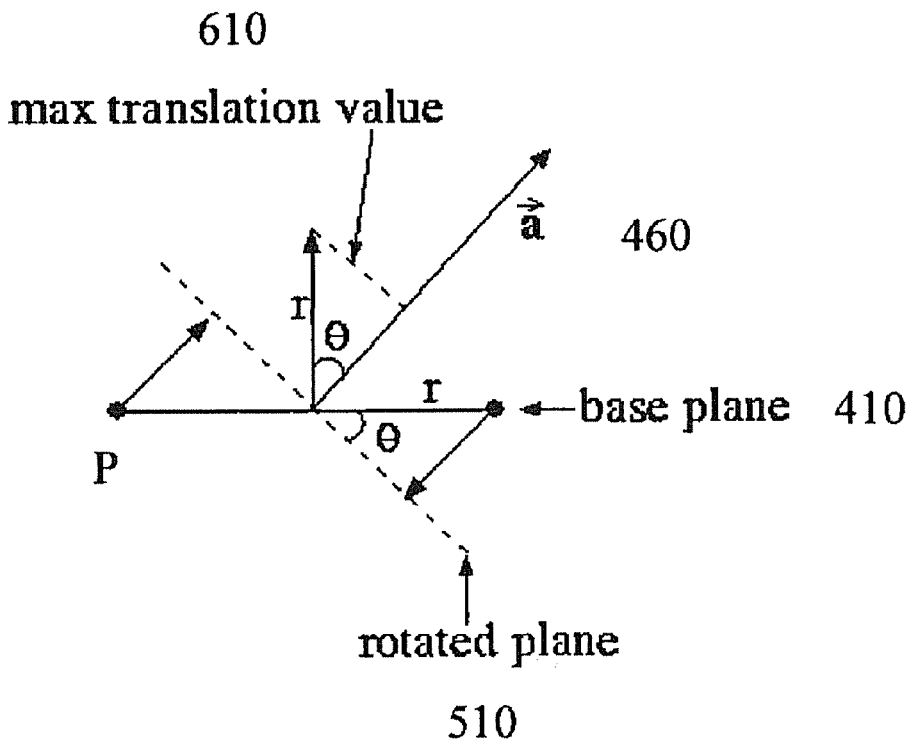
FIG. 6 is a graphical representation illustrating the geometry for finding the maximum translation value for a point using similar triangles in accordance with an embodiment of the invention.

FIG. 6 is a graphical representation illustrating the geometry 600 for finding the maximum translation value 610 for a point using similar triangles in accordance with an embodiment of the invention.

Step 3a: Calculate the maximum translation 610 that can occur. The pseudo-rotation of the points within a lens bounds 482 occurs about an axis of rotation. The axis of rotation can be found by taking the cross-product of the unit vector (0,0,1) with the apex-aligned vector 460 or a, that is, (0,0,1)×a=axis.

The maximum translation 610 occurs for the points (when taken with respect to the centre of the lens 480) that are on the lens bounds 482 and that are perpendicular to the axis of rotation. Mathematically, a point p for which maximum translation occurs is a point for which the following equation holds true: (p−lenspos)·axis=0, when p is on the lens bounds 482. The maximum translation 610 that can occur for a point p is found and is used to interpolate the translation values for all points interior to the lens bounds 482.

The maximum translation value 610 is found by taking a point p that is perpendicular to the axis of rotation (as stated above), and projecting it onto the rotated plane (see FIG. 6). The distance from the original point p to the projected point $p_{projected}$ is the maximum translation value 610. As shown in FIG. 6, similar triangles can be used to find the maximum translation value for a point p. Mathematically, the maximum translation value maxt 610 is as follows: maxt−‖(0,0,radius)−proj ((0,0,radius), a)‖, where a is the apex-aligned vector 460, radius or r is the radius of the lens bounds 482, and the function proj(i, j) returns the projection of vector i onto vector j.

Figure 7:
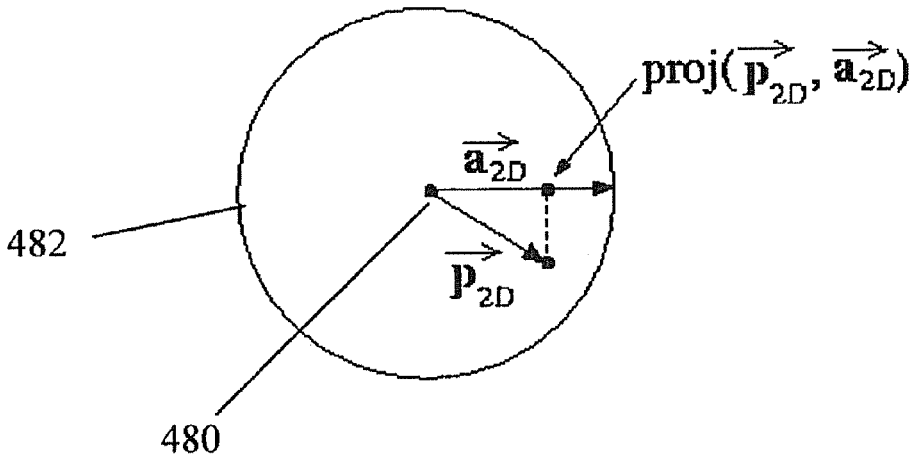
FIG. 7 is a graphical representation illustrating the geometry of a projection for finding the scaling factor that is used in the calculation of the magnitude of translation for a point in accordance with an embodiment of the invention.

FIG. 7 is a graphical representation illustrating the geometry 700 of a projection for finding the scaling factor that is used in the calculation of the magnitude of translation for a point p in accordance with an embodiment of the invention.

Step 3b: Calculate the magnitude of the translation for each point p. To find the magnitude of the translation for each point p, the apex-aligned vector a or 460 is projected onto the z=0 plane which results in a two-dimensional vector $a_{2D}$ (i.e., where the z coordinate is 0). This is equivalent to taking the x and y coordinates, and disregarding the z coordinate: $a_{2D}=(a_x,$ $a_y$). The $a_{2D}$ vector is then normalized. Each point p within the lens bounds 482 is projected onto the z=0 plane (but no normalization occurs), and is specified as a vector with respect to the centre of the lens lenspos or 480: $p_{2D}=(p_x, p_y)-(lenspos_x, lenspos_y)$. The vectors $a_{2D}$ and $p_{2D}$ are used to find a scaling factor 25 that will scale the maximum translation value maxt 610, which will result in the magnitude of translation for the point p. The scaling factor $scale_p$ is found by projecting $p_{2D}$ onto $a_{2D}$, and taking the magnitude of the resulting vector (see FIG. 7): $scale_p=\|proj\ (p_{2D}, a_{2D})\|$. The magnitude of translation $trans_p$ of the point p is the maximum translation value 610 scaled by the scaling factor $scale_p$: $trans_p=(-scale_p/radius)*maxt$, where radius is the radius r of the lens bounds 482.

Step 3c: Translate each point p with respect to the lens position 480. Each point p is translated with respect to the lens position 480 in order to maintain the spatial relationships between points. Therefore, each point p is projected onto the plane that contains the lens position point 480 and that is parallel to the z=0 plane. Once the point has been projected onto this plane, the point is translated along the apex-aligned vector a or 460, by a magnitude of translation $trans_p$: $p_{translated}=(p_x, p_y, lenspos_z)+trans_p*a_{normalized}$, where $a_{normalized}$ is the unit apex-aligned vector. Since the elevation value of the point was eliminated when the point was projected onto the plane that contains the lens position 480, the elevation value must be added back to the point: $p_{translated}=p_{translated}+(p_z-lenspos_z)*a_{normalized}$.

Step 4: Displace each point p by the appropriate magnification factor. As shown in FIG. 4, a user can view the terrain dataset 450 from any point vrp above the terrain surface. Since the displacement of each point p should not exceed the vrp, the magnitude of displacement is computed with respect to the vrp. The magnitude of displacement takes into consideration the original elevation height of a point p and is computed using the equation $height_p=h-(h/mag)$, where mag is the desired magnification of the lens, $h=\|vo\|-p_z$, and vo is the vector from the origin of the dataspace 490 in which the terrain data 450 is defined to the vrp. If the point p is within the shoulder region of the lens (i.e., between the focal bounds 481 and the lens bounds 482), then the magnitude of displacement must be scaled by the shoulder drop-off function: $height_p=shoulder(p)*(h-(h/mag))$.

Figure 8:
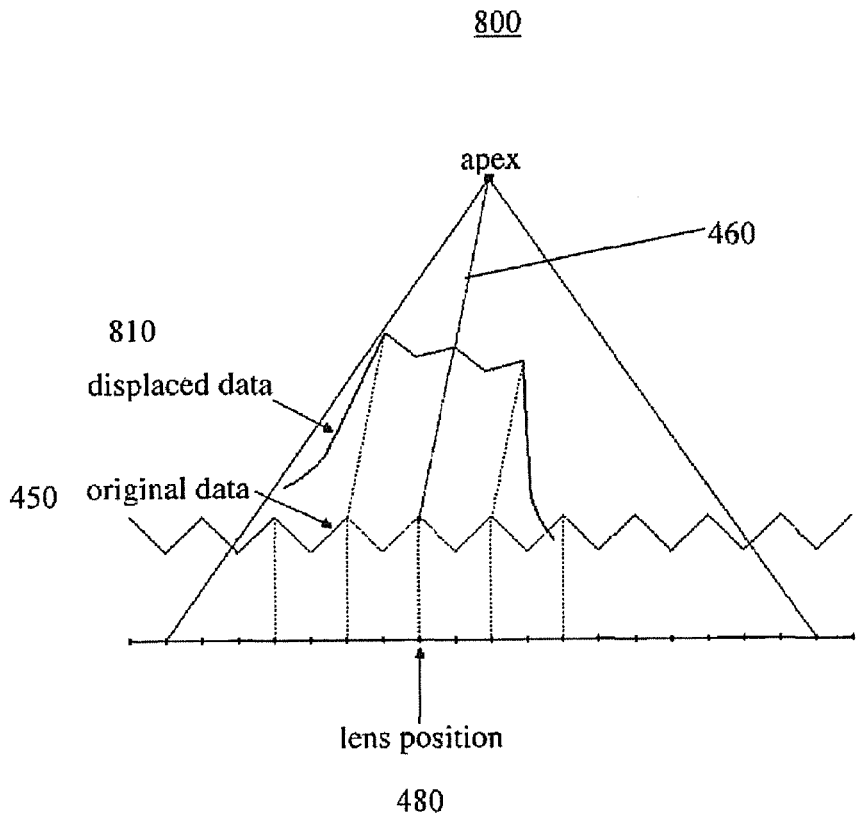
FIG. 8 is a graphical representation illustrating the geometry of the result of the pseudo-rotation and displacement of each point that falls within the lens bounds in accordance with an embodiment of the invention.

FIG. 8 is a graphical representation illustrating the geometry 800 of the result of the pseudo-rotation and displacement of each point p that falls within the lens bounds 482 in accordance with an embodiment of the invention. The displacement of a point p is performed using the translated point $p_{translated}$ that was found above and adding the height value $height_p$ along the z-normalized apex-aligned vector: $p_{displaced}=p_{translated}+height_p*a_{znormalized}$. The result of the displacement of all points p within the lens bounds 482, that is, the displaced data or lens 810, is shown in FIG. 8.

Figure 9:
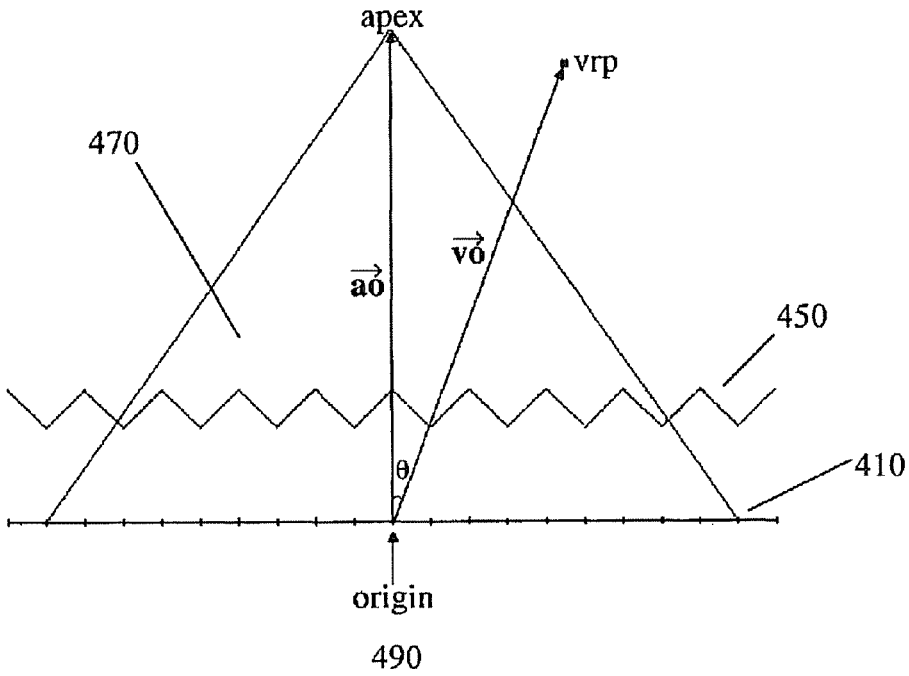
FIG. 9 is a graphical representation illustrating the geometry of the rotation towards the view reference point of each point that falls within the lens bounds in accordance with an embodiment of the invention.

FIG. 9 is a graphical representation illustrating the geometry 900 of the rotation towards the vrp of each point p that falls within the lens bounds 482 in accordance with an embodiment of the invention. In FIG. 9, the angle and axis of rotation are computed using the ao and vo vectors.

Step 5: Rotate the lens 810 towards the view reference point vrp. Since the terrain dataset 450 can be viewed from any point vrp above the terrain surface, it would be useful to be able to see the lens focal region (i.e., the region between the lens position 480 and the focal bounds 481) at all times from the viewpoint. To accomplish this, each point p that falls within the lens bounds 482 is rotated towards the vrp. Given the origin o or 490 of the dataspace 470 in which the terrain data 450 is defined, two vectors $ao=(apex-o)_{normalized}$ and $vo=(vrp-o)_{normalized}$ are defined. The axis of rotation is computed using the cross-product of the two vectors axis=ao×vo, and the angle of rotation is θ=arccos(ao·vo) (see FIG. 9). Quaternions are used to rotate each point $p_{displaced}$ of the displaced data 810 by an angle θ about the axis of rotation axis which yields the desired rotated point $p_{rotated}$.

Figure 10:
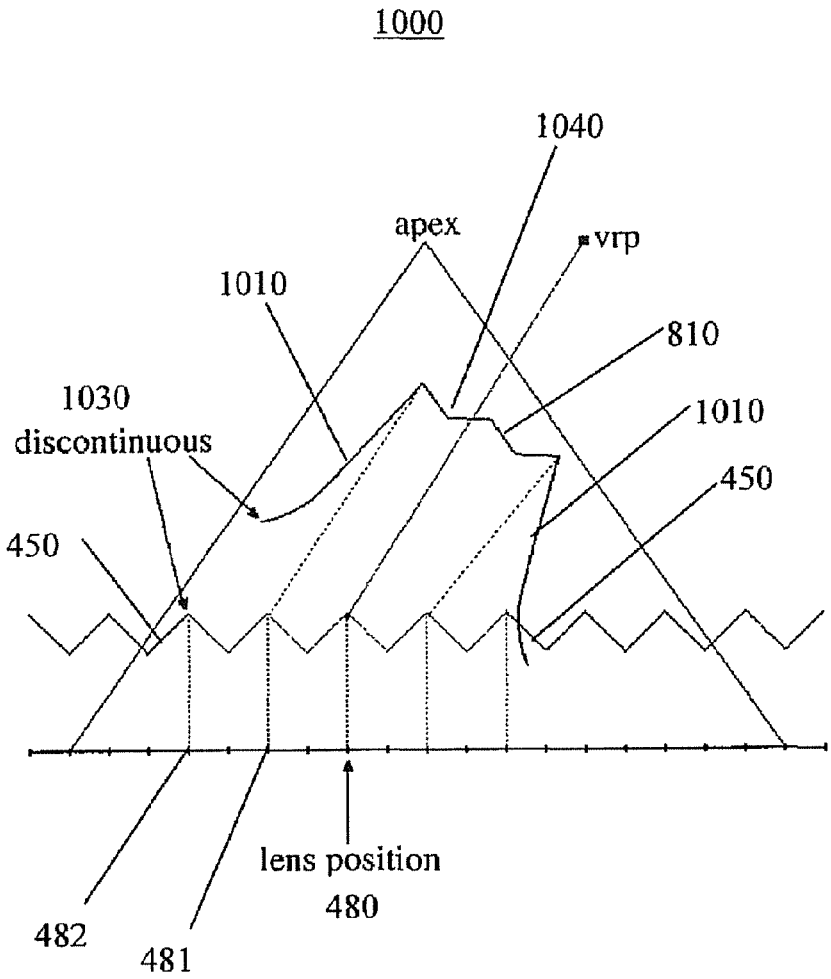
FIG. 10 is a graphical representation illustrating the geometry of a discontinuity occurring between the shoulder region and the context data after the application of the displacement and rotation transformations in accordance with an embodiment of the invention.

FIG. 10 is a graphical representation illustrating the geometry 1000 of a discontinuity 1030 occurring between the shoulder region 1010 and the context data 450 after the application of the displacement and rotation transformations in accordance with an embodiment of the invention.

Step 6: Create smooth shoulders 1010 that are connected to the context data 450. After displacement and rotation, the shoulders 1010 of the lens 810 do not line up correctly with the context data 450 (i.e., points that fall outside of the lens bounds 482). FIG. 10 illustrates the resulting discontinuities 1030. In order to connect the shoulders 1010 to the context 450 (i.e., the terrain data 450 beyond the lens bounds 482), each point p that falls within the shoulder 1010 of the lens 810 will be translated an appropriate amount which will compensate for the discontinuity 1030. The following steps are used to find the magnitude and direction of translation for a point p that falls within the shoulder 1010 of the lens 810.

Step 6a: Find the axis of rotation that a point p was rotated about. Each point p that falls within the shoulder 1010 of the lens 810 has undergone two rotation transformations (i.e., the pseudo-rotation towards the apex and the rotation towards the vrp). The axes of rotation for these two transformations may have been different. In other words, the rotation of any given point p is the result of two separate rotations. These two rotations can be expressed as a single rotation about a vector axis resulting from the cross product of ao and v (i.e., axis=ao×v ). The vector ao is defined above and the vector $v=p_{rotated}-p$.

FIG. 11 is a graphical representation illustrating the geometry 1100 of the projection of $p_{2D}$ onto the axis of rotation and the resulting edge points in accordance with an embodiment of the invention.

Step 6b: Project the point p onto the axis of rotation. The two-dimensional version of the point p was defined above as $p_{2D}=(p_x, p_y)-(lenspos_x, lenspos_y)$. The vector $p_{2D}$ is projected onto the two-dimensional version of the axis of rotation $axis_{2D}$ (see FIG. 11), or, $p_{projected}=proj\ (p_{2D}, axiS_{2D})$.

Step 6c: Find two points that are on the edge of the lens bounds 482 that form a line through $p_{projected}$ that is perpendicular to $axis_{2D}$. In order to find two edge points that correspond to this definition, the equation of a line is used $pt=pt_o+td$, where $pt_o=p_{projected}$, and the direction vector is defined as $d=(p_{2D}-p_{projected})/\|(p_{2D}-p_{projected})\|$. The parameter t can be found using Pythagorean's Theorem: $t=\sqrt{(radius^2-\|p_{projected}\|^2)}$ where radius or r is the radius of the lens bounds 482. Two edge points $pt1_{2D}$ and $pt2_{2D}$ are found by using ±t in the line equation. The z elevation coordinates of these two points are found using the approximation method that is described in the optimizations section below, yielding the three-dimensional edge points pt1 and pt2.

Step 6d: Apply rotation and displacement transformations to each edge point pt1, pt2 and find the difference vectors $diff_1$, $diff_2$ between the original and transformed edge points. Each edge point will undergo the pseudo-rotation, displacement, and final rotation transformations that are specified in Steps 2-5 above in order to obtain the difference between the original edge points (pt1 and pt2) and the transformed edge points ($pt1_{transformed}$ and $pt2_{transformed}$, respectively). This difference specifies the magnitude and direction of translation that the edge points will undergo, which will essentially connect the lens shoulder region 1010 back to the context data 450. The difference vectors for each edge are used as a weighted average to find the amount of translation that is needed for points p that are interior to the lens bounds 282 (i.e., points that do not fall on the lens bounds 282 but rather fall between the lens bounds 282 and the focal bounds 481).

FIG. 12 is a graphical representation illustrating the geometry 1200 of the final lens 1210 resulting from the displacement of terrain data 450 that fell within the lens bounds 482 in accordance with an embodiment of the invention.

Step 6e: Calculate the amount of translation for a point p to obtain smooth shoulders 1010. The difference vectors $diff_1$ and $diff_2$ that were found for each edge point are used as a weighted average to find the amount of translation for a point p. The weight w for $diff_2$ is given by $w=\|(p_x, p_y)=pt2_{2D}\|/\|Pt1_{2D}-pt2_{2D}\|$, where $pt1_{2D}$ and $pt2_{2D}$ are as defined above. The difference vector $diff_p$ for point p is $diff_p=(1-\text{shoulder}(p))((1-w)\,diff_1+w\,diff_2)$, where shoulder(p) is the shoulder drop-off function. Since the weighted average is taken across the entire bounds of the lens, and since the points that fall within the focal region 1040 of the lens 810 should not be translated (i.e., only the shoulders 1010 of the lens 810 are altered), the difference vector must take into consideration the focal region 1040 of the lens 810. For this reason, the factor (1−shoulder (p)) is introduced. The final displacement of a point p is $p_{displaced}=p_{rotated}+diff_p$. FIG. 12 shows a cross section of the final result 1210 of the displacement of terrain data that fell within the lens bounds 482. Note that the resulting lens 1210 has shoulders 1230 surrounding the focal region 1220 that smoothly join the surrounding context 450 (i.e., the terrain data 450 beyond the lens bounds 482).

The optimizations referred to above are described in the following.

Terrain Lens Mesh. The terrain datasets 450 that are used in terrain visualization are often very large in size, consisting of thousands of data points. When this is the case, due to processing limitations, it may not be feasible to run each point through the terrain displacement method described above. To increase efficiency of the method, a terrain lens mesh may be used to visualize the displacement of a terrain lens 1210. The mesh bounds are defined as the bounds 482 of the lens 1210. Two-dimensional points are inserted into the mesh and a Delauney triangulation is calculated. In order to visualize the terrain elevations, the z elevation of each point is approximated using the surrounding terrain dataset elevation values as described below. Once the z elevations for each point within the mesh have been approximated, each three-dimensional mesh point can be run through the terrain displacement method described above.

Elevation Approximations. Since terrain elevation datasets 450 are discrete and finite, any given coordinate that is within the bounds of the terrain dataset may not have an explicit elevation value associated with it. Therefore, within the terrain displacement method and the terrain lens mesh optimization both described above, an approximation for the z elevation for any given (x, y) coordinate may be used. This approximation uses the surrounding terrain dataset coordinates to compute the estimated elevation for an (x, y) coordinate. The terrain dataset coordinates can be random or ordered, but ordered points (such as a grid structure) will increase efficiency of the approximation algorithm. According to one embodiment, a bilinear approximation may be used given a grid structured terrain dataset. That is, given an (x, y) coordinate, its elevation may be approximated by finding the four enclosing grid coordinates that surround the (x, y) coordinate. Then, a bilinear interpolation is computed using the four elevation values associated with the four enclosing grid coordinates.

Figure 13:
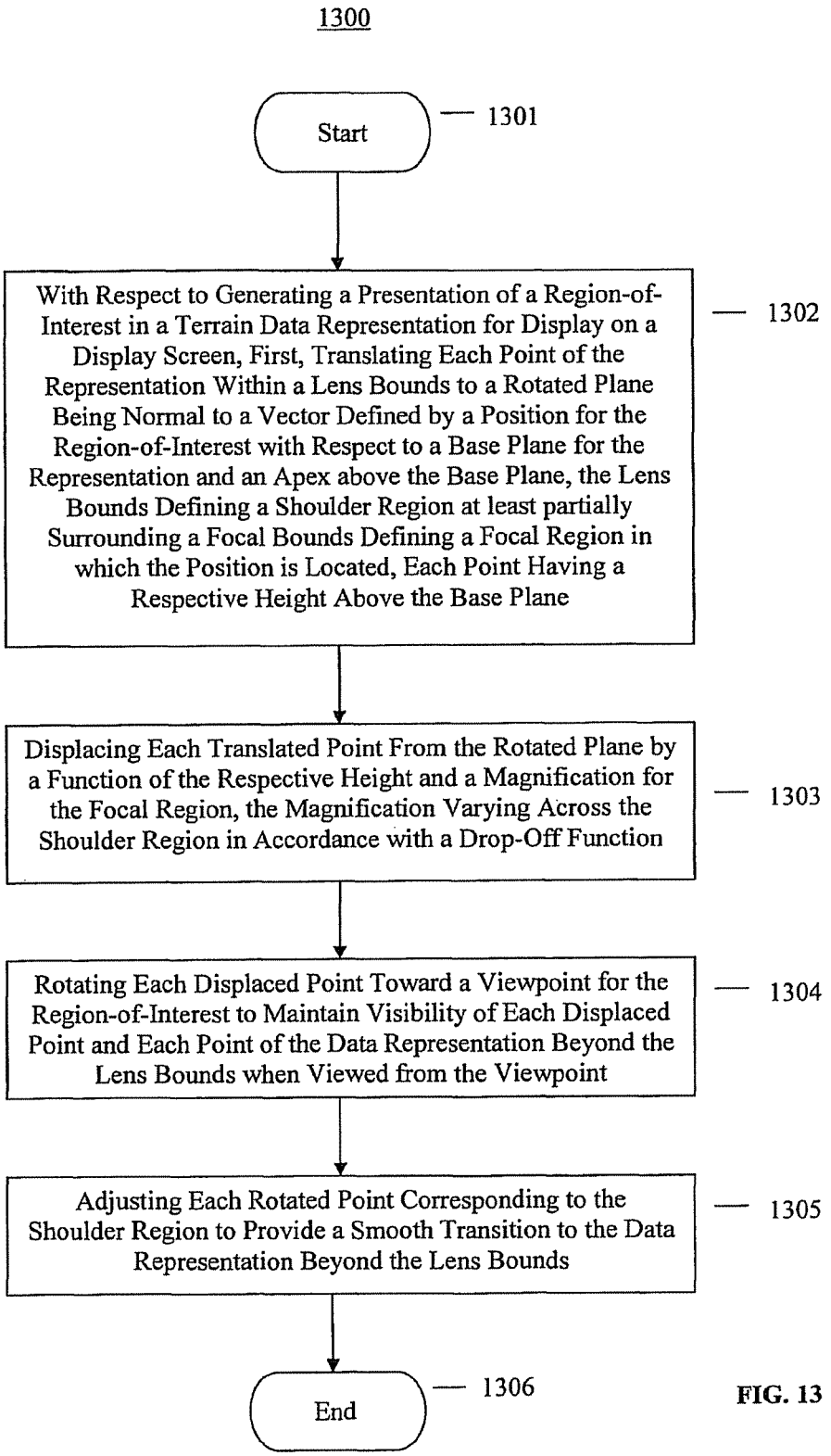

The above described method may be summarized with the aid of a flowchart. FIG. 13 is a flow chart illustrating operations 1300 of modules 331 within the memory 330 of a data processing system 300 for generating a presentation of a region-of-interest (e.g., at 480) in a terrain data representation 450 for display on a display screen 340, in accordance with an embodiment of the application.

At step 1301, the operations 1300 start.

At step 1302, each point p of the representation 450 within a lens bounds 482 is translated to a rotated plane 510 being normal to a vector 460 defined by a position 480 for the region-of-interest with respect to a base plane 410 for the representation 450 and an apex 440 above the base plane 410, the lens bounds 482 defining a shoulder region (i.e., between 482 and 481) at least partially surrounding a focal bounds 481 defining a focal region (i.e., between 481 and 480) in which the position 480 is located, each point p having a respective height pz above the base plane 410.

At step 1303, each translated point $p_{translated}$ is displaced from the rotated plane 510 by a function $height_p$ of the respective height $p_z$ and a magnification mag for the focal region 481, 482, the magnification mag varying across the shoulder region 481, 482 in accordance with a drop-off function shoulder(p).

At step 1304, each displaced point $p_{displaced}$ is rotated toward a viewpoint vrp for the region-of-interest to maintain visibility of each displaced point $p_{displaced}$ and each point p of the data representation 450 beyond the lens bounds 482 when viewed from the viewpoint vrp.

At step 1305, each rotated point $p_{rotated}$ corresponding to the shoulder region 481, 482 is adjusted to provide a smooth transition 1230 to the data representation 450 beyond the lens bounds 482.

At step 1306, the operations 1300 end.

The method may further include projecting each adjusted point $p_{rotated}+diff_p$ within the shoulder region 1230, each rotated point $p_{rotated}$ within the focal region 1220, and each point p of the representation 450 beyond the lens bounds 482 onto a plane 201 in a direction 231 aligned with the viewpoint vrp to produce the presentation. The method may further include displaying the presentation on the display screen 340. The step of translating 1302 each point p may further include determining a maximum translation maxt 610 for a point p on the lens bounds 482 and determining a translation $trans_p$ for each point p within the lens bounds (i.e., between 482 and 480) by scaling the maximum translation 610 in accordance with a distance $scale_p$/radius of each point from the lens bounds 482. The function $height_p$ may be a product of the magnification mag and a difference h between a magnitude of a vector||vo|| defined by an origin 490 of the representation 450 with respect to the base plane 410 and the viewpoint vrp and the respective height $p_z$. The step of rotating 1304 each displaced point $p_{displaced}$ may further include determining an axis of rotation axis for the rotating from a cross product of a vector ao defined by an origin 490 of the representation 450 with respect to the base plane 410 and the viewpoint vrp and a vector vo defined by the origin 290 and the apex apex 440. The step of the adjusting 1305 each rotated point $p_{rotated}$ corresponding to the shoulder region 481, 482 may further include adding to each rotated point $p_{rotated}$ a weighted average $diff_p=(1-\text{shoulder}(p))((1-w)\,diff_1+w\,diff_2)$ of first and second difference vectors $diff_1$, $diff_2$ scaled by the drop-off function, the first and second difference vectors $diff_1$, $diff_2$ corresponding to a difference between first and seconds points pt1, pt2 on the lens bound 482 and corresponding first and second displaced points $pt1_{transformed}$, $pt2_{transformed}$, respectively, the first and second points pt1, pt2 being on a line $pt=pt_o+td$ drawn through the rotated point $p_{rotated}$. The method may further include approximating the representation 450 with a mesh. And, the method may further include approximating the respective height $p_z$ using height information from surrounding points.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a prerecorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the exemplary data processing system 300 of FIG. 3 can be contained in a data carrier product according to one embodiment of the invention. This data carrier product can be loaded into and run by the exemplary data processing system 300 of FIG. 3. In addition, the sequences of instructions which when executed cause the method described herein to be performed by the exemplary data processing system 300 of FIG. 3 can be contained in a computer software product according to one embodiment of the invention. This computer software product can be loaded into and run by the exemplary data processing system 300 of FIG. 3. Moreover, the sequences of instructions which when executed cause the method described herein to be performed by the exemplary data processing system 300 of FIG. 3 can be contained in an integrated circuit product (e.g., a hardware module) including a coprocessor or memory according to one embodiment of the invention. This integrated circuit product can be installed in the exemplary data processing system 300 of FIG. 3.

The embodiments of the invention described above are intended to be exemplary only. Those skilled in the art will understand that various modifications of detail may be made to these embodiments, all of which come within the scope of the invention.

What is claimed is:

1. A method for generating a presentation of a region-of-interest in a terrain data representation for display on a display screen of a data processing system, comprising:

translating each point of the representation, by the data processing system, within a lens bounds to a rotated plane being normal to a vector defined by a position for the region-of-interest with respect to a base plane for the representation and an apex above the base plane, the lens bounds defining a shoulder region at least partially surrounding a focal bounds defining a focal region in which the position is located, each point having a respective height above the base plane;

displacing each translated point from the rotated plane, by the data processing system, by a function of the respective height and a magnification for the focal region, the magnification varying across the shoulder region in accordance with a drop-off function;

rotating each displaced point, by the data processing system, toward a viewpoint for the region-of-interest to maintain visibility of each displaced point; and adjusting each rotated point corresponding to the shoulder region, by the data processing system, to provide a smooth transition to the data representation beyond the lens bounds.

2. The method of claim 1 and further comprising projecting each adjusted point within the shoulder region, each rotated point within the focal region, and each point of the representation beyond the lens bounds onto a plane in a direction aligned with the viewpoint to produce the presentation.

3. The method of claim 2 and further comprising displaying the presentation on the display screen.

4. The method of claim 3 wherein the translating of each point further comprises determining a maximum translation for a point on the lens bounds and determining a translation for each point within the lens bounds by scaling the maximum translation in accordance with a distance of each point from the lens bounds.

5. The method of claim 3 wherein the function is a product of the magnification and a difference between a magnitude of a vector defined by an origin of the representation with respect to the base plane and the viewpoint and the respective height.

6. The method of claim 3 wherein the rotating of each displaced point further comprises determining an axis of rotation for the rotating from a cross product of a vector defined by an origin of the representation with respect to the base plane and the viewpoint and a vector defined by the origin and the apex.

7. The method of claim 3 wherein the adjusting of each rotated point corresponding to the shoulder region further comprises adding to each rotated point a weighted average of first and second difference vectors scaled by the drop-off function, the first and second difference vectors corresponding to a difference between first and seconds points on the lens bound and corresponding first and second displaced points, respectively, the first and second points being on a line drawn through the rotated point.

8. The method of claim 1 and further comprising approximating the representation with a mesh.

9. The method of claim 1 and further comprising approximating the respective height using height information from surrounding points.

10. A system comprising:

a processor; and a module that is executable on the processor for translating each point of a terrain data representation within a lens bounds of a presentation of a region-of-interest, for display on a display screen, to a rotated plane being normal to a vector defined by a position for the region-of-interest with respect to a base plane for the representation and an apex above the base plane, the lens bounds defining a shoulder region at least partially surrounding a focal bounds defining a focal region in which the position is located, each point having a respective height above the base plane;

a module that is executable on the processor for displacing each translated point from the rotated plane by a function of the respective height and a magnification for the focal region, the magnification varying across the shoulder region in accordance with a drop-off function;

a module that is executable on the processor for rotating each displaced point toward a viewpoint for the region-of-interest to maintain visibility of each displaced point; and a module that is executable on the processor for adjusting each rotated point corresponding to the shoulder region to provide a smooth transition to the data representation beyond the lens bounds.

11. The system of claim 10 and further comprising a module for projecting each adjusted point within the shoulder region, each rotated point within the focal region, and each point of the representation beyond the lens bounds onto a plane in a direction aligned with the viewpoint to produce the presentation.

12. The system of claim 11 and further comprising a module for displaying the presentation on the display screen.

13. The system of claim 12 wherein the module for translating each point further comprises a module for determining a maximum translation for a point on the lens bounds and for determining a translation for each point within the lens bounds by scaling the maximum translation in accordance with a distance of each point from the lens bounds.

14. The system of claim 12 wherein the function is a product of the magnification and a difference between a magnitude of a vector defined by an origin of the representation with respect to the base plane and the viewpoint and the respective height.

15. The system of claim 12 wherein the module for rotating each displaced point further comprises a module for determining an axis of rotation for the rotating from a cross product of a vector defined by an origin of the representation with respect to the base plane and the viewpoint and a vector defined by the origin and the apex.

16. The system of claim 12 wherein the module for adjusting each rotated point corresponding to the shoulder region further comprises a module for adding to each rotated point a weighted average of first and second difference vectors scaled by the drop-off function, the first and second difference vectors corresponding to a difference between first and seconds points on the lens bound and corresponding first and second displaced points, respectively, the first and second points being on a line drawn through the rotated point.

17. The system of claim 10 and further comprising a module for approximating the representation with a mesh.

18. The system of claim 10 and further comprising a module for approximating the respective height using height information from surrounding points.

19. One or more tangible computer-readable media having stored thereon, computer-executable instructions that, if executable by a data processing system, cause the data processing system to perform a method comprising:

translating each point of a terrain data representation within a lens bounds of a presentation of a region-of-interest, for display on a display screen, to a rotated plane being normal to a vector defined by a position for the region-of-interest with respect to a base plane for the representation and an apex above the base plane, the lens bounds defining a shoulder region at least partially surrounding a focal bounds defining a focal region in which the position is located, each point having a respective height above the base plane;

displacing each translated point from the rotated plane by a function of the respective height and a magnification for the focal region, the magnification varying across the shoulder region in accordance with a drop-off function;

rotating each displaced point toward a viewpoint for the region-of-interest to maintain visibility of each displaced point; and adjusting each rotated point corresponding to the shoulder region to provide a smooth transition to the data representation beyond the lens bounds.

20. The tangible computer-readable media of claim 19 and further comprising projecting each adjusted point within the shoulder region, each rotated point within the focal region, and each point of the representation beyond the lens bounds onto a plane in a direction aligned with the viewpoint to produce the presentation.

21. The tangible computer-readable media of claim 20 and further comprising displaying the presentation on the display screen.

22. The tangible computer-readable media of claim 21 wherein the translating of each point further comprises determining a maximum translation for a point on the lens bounds and determining a translation for each point within the lens bounds by scaling the maximum translation in accordance with a distance of each point from the lens bounds.

23. The tangible computer-readable media of claim 21 wherein the function is a product of the magnification and a difference between a magnitude of a vector defined by an origin of the representation with respect to the base plane and the viewpoint and the respective height.

24. The tangible computer-readable media of claim 21 wherein the rotating of each displaced point further comprises determining an axis of rotation for the rotating from a cross product of a vector defined by an origin of the representation with respect to the base plane and the viewpoint and a vector defined by the origin and the apex.

25. The tangible computer-readable media of claim 21 wherein the adjusting of each rotated point corresponding to the shoulder region further comprises adding to each rotated point a weighted average of first and second difference vectors scaled by the drop-off function, the first and second difference vectors corresponding to a difference between first and seconds points on the lens bound and corresponding first and second displaced points, respectively, the first and second points being on a line drawn through the rotated point.

26. The tangible computer-readable media of claim 19 and further comprising approximating the representation with a mesh.

27. The tangible computer-readable media of claim 19 and further comprising approximating the respective height using height information from surrounding points.

*28. A method comprising:*

*translating with at least one processor, data within a bounds of a lens from a base plane to a rotated plane to form translated data, wherein the bounds of the lens defines a shoulder region at least partially surrounding a focal region; and*

*displacing the translated data along an axis perpendicular to the rotated plane to form displaced data.*

*29. The method of claim 28, wherein the axis perpendicular to the rotated plane comprises a vector between:*

*a lens position of the lens, and*

*an apex of a viewing volume including the lens.*

*30. The method of claim 29, wherein the translated data is displaced to form the displaced data by an amount determined according to:*

*a magnification of the focal region of the lens; and*

*a vector between:*

*an origin of the viewing volume, and*

*a view reference point.*

*31. The method of claim 28, further comprising rotating the displaced data to form rotated data.*

*32. The method of claim 31, wherein the displaced data is rotated towards a view reference point to form the rotated data.*

*33. The method of claim 32, wherein the displaced data is rotated by a rotation angle to form the rotated data; and*

*wherein the rotation angle is proportional to an angle formed by:*

*a vector between an apex and an origin of a viewing volume including the lens, and*

*a vector between the view reference point and the origin of the viewing volume.*

*34. The method of claim 31, further comprising adjusting the shoulder region of the rotated data to provide a smooth transition between the data within the bounds of the lens and data beyond the bounds of the lens.*

*35. A system comprising:*

*one or more processors configured to:*

*translate data within a bounds of a lens from a base plane to a rotated plane to form translated data, wherein the bounds of the lens defines a shoulder region at least partially surrounding a focal region; and*

*displace the translated data along an axis perpendicular to the rotated plane to form displaced data.*

*36. The system of claim 35, wherein the axis perpendicular to the rotated plane comprises a vector between:*

*a lens position of the lens, and*

*an apex of a viewing volume including the lens.*

*37. The system of claim 35, wherein the one or more processors are configured to displace the translated data by an amount determined according to:*

*a magnification of the focal region of the lens; and*

*a vector between:*

*an origin of a viewing volume including the lens, and*

*a view reference point.*

*38. The system of claim 35, wherein the one or more processors are configured to rotate the displaced data to form rotated data.*

*39. The system of claim 38, wherein the one or more processors are configured to rotate the displaced data towards a view reference point to form the rotated data.*

*40. The system of claim 38, wherein the one or more processors are configured to adjust the shoulder region of the rotated data to provide a smooth transition between the data within the bounds of the lens and data beyond the bounds of the lens.*

*41. At least one non-transitory computer-readable medium including instructions for execution on one or more processors, wherein the instructions comprise:*

*translation instructions configured to translate data within a bounds of a lens from a base plane to a rotated plane to form translated data, wherein the bounds of the lens defines a shoulder region at least partially surrounding a focal region; and*

*displacement instructions configured to displace the translated data along an axis perpendicular to the rotated plane to form displaced data.*

*42. The at least one non-transitory computer-readable medium of claim 41, wherein the axis perpendicular to the rotated plane comprises a vector between:*

*a lens position of the lens, and*

*an apex of a viewing volume including the lens.*

*43. The at least one non-transitory computer-readable medium of claim 41, wherein the displacement instructions are configured to displace the translated data by an amount determined according to:*

*a magnification of the focal region of the lens; and*

*a vector between:*

*an origin of a viewing volume including the lens, and*

*a view reference point.*

*44. The at least one non-transitory computer-readable medium of claim 41, wherein the instructions comprise rotation instructions configured to rotate the displaced data to form rotated data.*

*45. The at least one non-transitory computer-readable medium of claim 44, wherein the rotation instructions are configured to rotate the displaced data towards a view reference point to form the rotated data.*

*46. The at least one non-transitory computer-readable medium of claim 45, wherein the rotation instructions are configured to rotate the displaced data by a rotation angle to form the rotated data; and*

*the rotation angle is proportional to an angle formed by:*

*a vector between an apex and an origin of a viewing volume including the lens, and*

*a vector between the view reference point and the origin of the viewing volume.*

*47. The at least one non-transitory computer-readable medium of claim 44, wherein the instructions comprise adjustment instructions configured to adjust the shoulder region of the rotated data to provide a smooth transition between the data within the bounds of the lens and data beyond the bounds of the lens.*

* * * * *